J. CALCATERRA.
SAFETY DEVICE FOR THE CLUTCH CONTROLLING MEANS OF AUTOMOBILES.
APPLICATION FILED SEPT. 10, 1919.
1,363,082.
Patented Dec. 21, 1920.
2 SHEETS—SHEET 1.
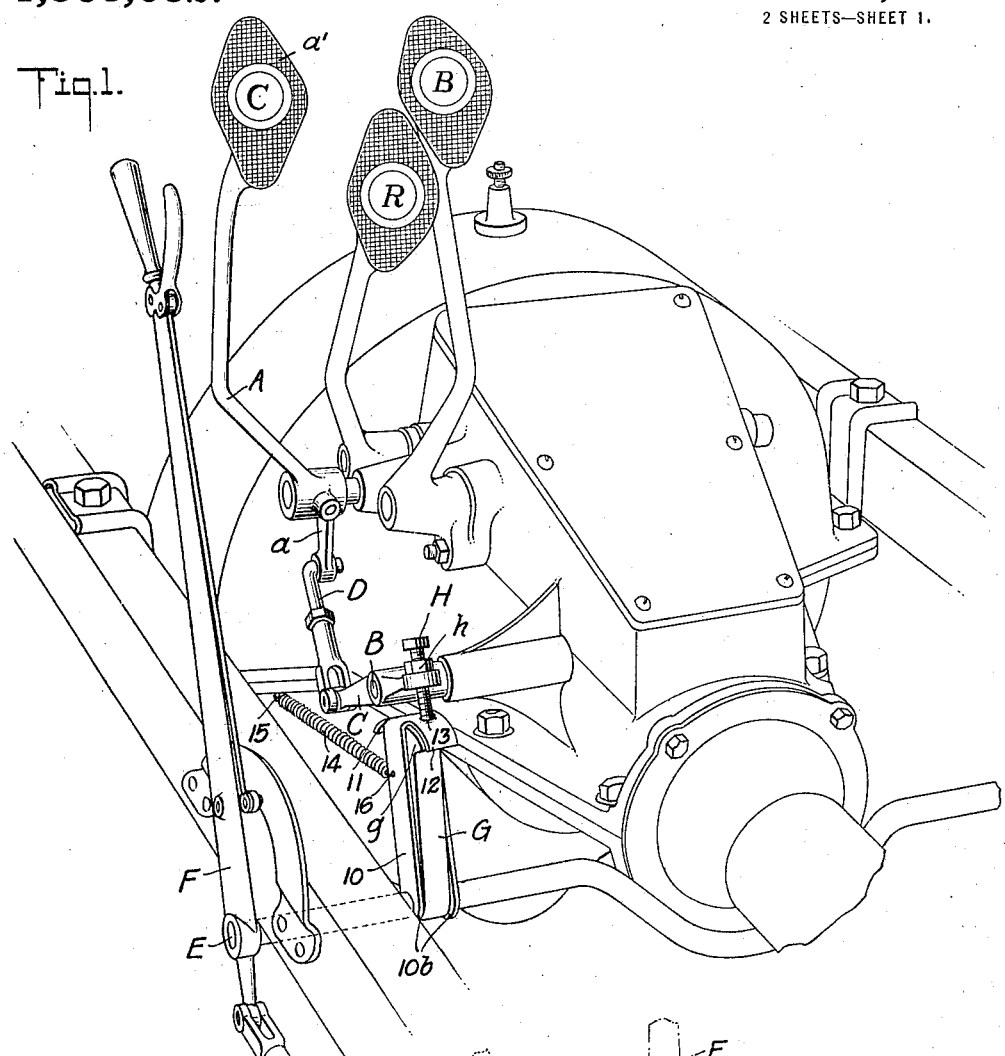
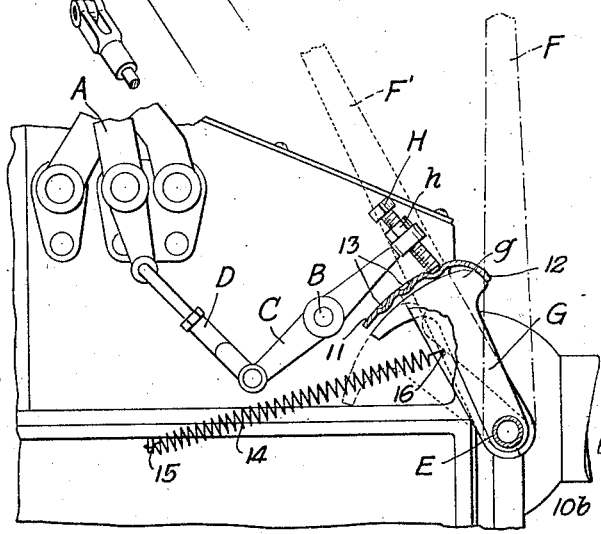
WITNESSES
INVENTOR
J. Calcaterra
BY
ATTORNEYS J. CALCATERRA.
SAFETY DEVICE FOR THE CLUTCH CONTROLLING MEANS OF AUTOMOBILES.
APPLICATION FILED SEPT. 10, 1919.
1,363,082.
Patented Dec. 21, 1920.
2 SHEETS—SHEET 2.
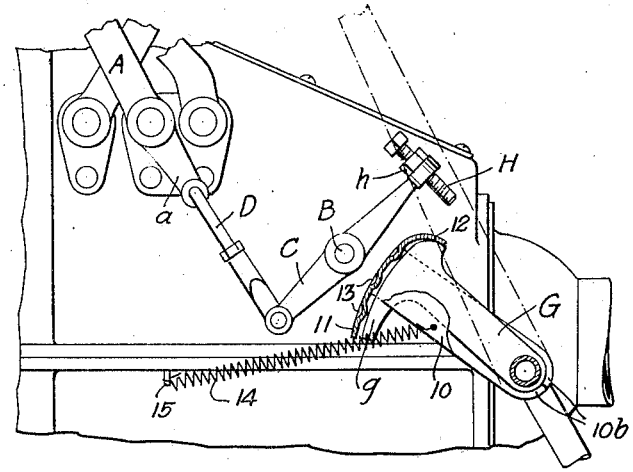
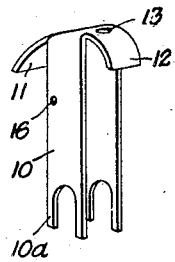
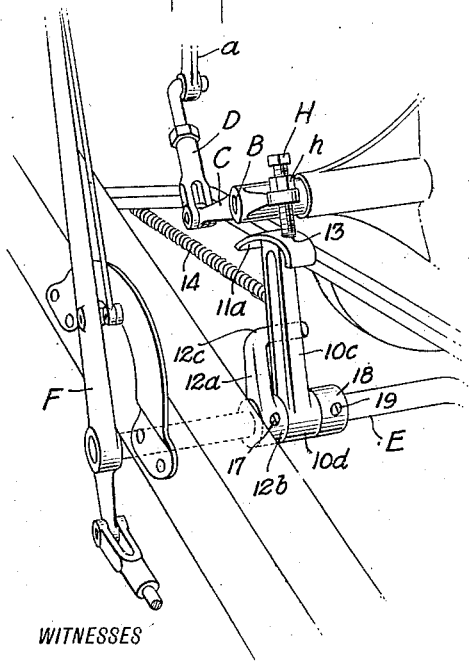
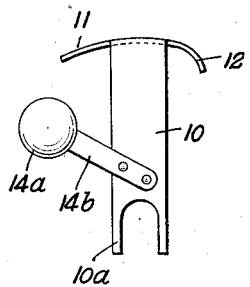
WITNESSES
INVENTOR
J. Calcaterra
BY
ATTORNEYS

UNITED STATES PATENT OFFICE.

JOSEPH CALCATERRA, OF NEW YORK, N. Y., ASSIGNOR OF ONE-THIRD TO RICHARD J. CRUICE AND ONE-THIRD TO ANDREW J. FINNERTY, BOTH OF NEW YORK, N. Y.

SAFETY DEVICE FOR THE CLUTCH-CONTROLLING MEANS OF AUTOMOBILES.

1,363,082.　　　　　Specification of Letters Patent.　　Patented Dec. 21, 1920.

Application filed September 10, 1919. Serial No. 322,771.

*To all whom it may concern:*

Be it known that I, JOSEPH CALCATERRA, a citizen of the United States, and a resident of the city of New York, borough of the Bronx, in the county of Bronx and State of New York, have invented a new and Improved Safety Device for the Clutch-Controlling Means of Automobiles, of which the following is a description.

My invention relates to a means to prevent an automobile from accidentally creeping forward or running away when the crank is turned for starting. In a certain make of automobile a safety device is employed, to wit: The controller shaft has a device fixed thereon and termed a speed lever presenting an arcuate surface and the clutch lever has a screw thereon adapted to engage the arcuate surface of said speed lever when the latter is thrown into position with the turning of the controller shaft through the medium of the brake lever thereon in applying the brake so that the clutch spring cannot accidentally throw in the high gear. With the device referred to, the speed lever is thrown to the release position with the throwing down of the brake lever to the release position, leaving the clutch lever free to move since the screw thereon is not then opposed by the curved surface of the speed lever.

The general object of my invention is to provide a safety device of the indicated character in which the coacting members on the controller shaft and on the clutch lever will be so constructed and arranged that they will be set or brought into locking position by the putting on of the brake but they will not be released by the release of the brake.

A further object of the invention is to cause the release of the safety device only by the deliberate throwing of the clutch lever into the low speed position.

Again, in the operation of the automobiles in question since the speed lever so called is in set position only when the brake is applied any attempt to push the car is opposed by the brake pressure. An important object of my invention is to provide for permitting the release of the brake while maintaining the safety device set, thereby permitting of the automobile being pushed with slight effort unopposed by brake pressure, at the same time insuring that the clutch spring cannot automatically throw the clutch from neutral position.

More specifically, the invention has for an object to provide for embodying the invention in forms adapted to either automobiles already made and in use or in the automobiles in the factory.

The stated objects and others as will appear are attained by a safety device having the novel features and appurtenances hereinafter particularly described and defined in the claims.

Reference is to be had to the accompanying drawings forming a part of this specification, it being understood that the drawings are merely illustrative of examples of the invention.

Figure 1 is a perspective view of parts of an automobile having my invention applied thereto;

Fig. 2 is a partly sectional end view thereof, parts being broken away and showing the safety device in position for functioning;

Fig. 3 is a view similar to Fig. 2 but showing the safety device in the release position;

Fig. 4 is a separate perspective view of the member of the safety device associated with the controller shaft;

Fig. 5 is a perspective view showing my improved safety device in any form;

Fig. 6 is a separate side view of a modified form of the element shown in Fig. 4.

In the illustrated example, A indicates the clutch lever of an automobile of known make and to which my invention is particularly applicable, $a'$ indicating the pedal thereof, and $a$ an arm thereon which is adapted to rock the clutch shaft B which has a lever C thereon, one arm of which is connected with the arm $a$ of the clutch lever through connections D. The letter E indicates the controller shaft having the brake lever F. In automobiles of the type referred to the clutch spring (not shown) automatically throws the clutch into high gear when the foot pressure of the driver is removed from the pedal $a'$ and in order to prevent the high gear from being thrown in by the clutch spring, a safety device is provided, consisting of an arm G on the controller shaft E, said arm being usually termed a speed lever and adapted to be swung to the set position by turning of shaft E by lever F in the action of applying the brake.

Arm G is formed with a head $g$ presenting an arcuate cam surface. To coact with the lever G a screw H is provided extending through the free arm of the lever C and having a set nut $h$ for adjusting the screw, the arrangement being such that when the clutch lever A is moved to the neutral position of the clutch the screw H will contact with the head $g$ so that the latter offers a barrier to the screw H and thereby prevents movement of the clutch shaft B to the high gear position. The element G is fast on the controller shaft E and therefore, when the brake lever F is thrown down to the position to release the brake, the element G is swung away from the screw H leaving the clutch shaft B free to move to the high gear position, so that the arrangement permits of the accidental throwing in of the high gear when the engine is cranked and the brake released. Furthermore, if it is desired to move the automobile a short distance by pushing, for example, when the safety device is in set position and the brake therefore applied, the brake pressure opposes the movement of the automobile and therefore a considerable energy is required to overcome the brake pressure in pushing the automobile.

The above described elements and their described characteristics are well known in the type of automobile in question.

In accordance with my invention referring at first more particularly to Figs. 1 to 4, the safety device is provided involving an element 10 here shown as having two side arms forked at their lower end as at 10ª (Fig. 4) to be loosely applied to the controller shaft E and the ends of each fork bent toward each other as at 10ᵇ, Figs. 1 and 3, it being understood that the said element 10 may be otherwise suitably applied to said shaft to turn relatively thereto through the desired arc, the side arms in this form of the invention being spaced to lie adjacent to and at the sides of the usual safety element G. At the top of the element 10 the same has an arcuate head 11 corresponding generally with the head $g$ to overlie the latter. One end 12 of the head is directed downwardly to lie in front of the adjacent end of the head $g$ to be engaged by the latter when the controller shaft E is moved to a position to apply the brake; thereby in applying the brake the element 10 will be carried with the element G to a position to be engaged by the screw H when the clutch lever $a$ is in the neutral position. The head 11 has a series of depressions 13 therein to receive the end of the screw H to effect a positive interlock between said screw and the element 10 when the safety device is in set position. The plurality of depressions 13 is provided to insure the engagement of the screw with the element 10, if the latter be moved through an increased arc as the brake surfaces wear.

For the purpose of retracting the element 10 to inoperative position from the set position, any suitable means may be provided, there being shown in Figs. 1 and 3 a retractile spring 14, secured at one end as at 15 to any fixed part of the automobile and connected at its opposite end as at 16 with said element 10. With the described form of the invention the element G is merely utilized for setting the safety device, it having no other function with my attachment since said element is not engaged by coacting screw H of the safety device, the described form of my attachment being merely to conform it to the parts of the automobile as put out at the factory.

With the described arrangement when the brake lever F is thrown in a direction to apply the brake, the controller shaft E turning therewith will swing the element G from the full line position of Fig. 3 and dotted line position of Fig. 2 to the set position shown in Fig. 1 and in full lines in Fig. 2 and said element G in moving will, by contacting with the end 12 of the head 11, carry the element 10 from the position of Fig. 3 to the position shown in Fig. 1 and in full lines in Fig. 2, which is the set position so that the head 11 will be engaged by the screw H when the pedal lever A is thrown to the neutral position of Figs. 1 and 2. The brake lever F may, however, be now thrown down to release the brake, thereby carrying the element G with it, but the safety device comprising the element 10 and screw H will remain locked in set position. Therefore, although the brake is released the clutch cannot be thrown to the high gear position by the clutch spring until the pedal $a'$ is deliberately depressed to the low gear position which disengages the screw H from the element 10, thus releasing the latter and permitting its spring 14 to throw said element to the release position of Fig. 3 and therefore out of the path of the screw H, thereby permitting the clutch shaft B to move to the high gear position under the action of the clutch spring. In Fig. 6 the element 10 is the same in all respects as that described but instead of being thrown to the release position by the spring 14 it is provided with a weight 14ª on an arm 14ᵇ secured to the element 10 so that the weight will tend, the same as the spring 14, to throw the element 10 to the release position whenever the screw H is disengaged herefrom.

In Fig. 5 the form of the invention is adapted to be embodied in the automobile at the factory. With this form of the invention the described element G usually employed is omitted and an element 10ᶜ is provided having a hub 10ᵈ or other suitable formation to loosely fit the controller shaft E, said element having an arcuate head 11ª formed with the described depressions 13 to receive the screw H. The spring 14 may be employed with this invention as shown, or the weight 14ª. For swinging the element 10ᶜ to the set position with the throwing of the brake lever F to the braking position, I provide a suitable element on the controller shaft E, the illustrated form consisting of an arm 12ª, the hub 12ᵇ of which is fitted on the shaft E and secured thereto by a set screw 17, said arm 12ª having a laterally disposed terminal 12ᶜ extending into the plane of the element 10ᶜ to rock the latter to the set position with the application of the brake. Thus, said arm 12ª will be swung away from element 10ᶜ with the throwing of the brake lever to the release position leaving the safety device in set position and dependent as in the first instance on the throwing of the clutch lever to the low gear position of Fig. 3 for the release of the safety device. The element 10ᶜ in the present example is loosely mounted on the shaft E between the hub 12ᵇ and a collar 18 on said shaft and secured to the latter by a set screw 19. It will be obvious therefore that in both forms of the invention the throwing of the brake lever to the braking position sets the safety device, but the release of the brake does not release the safety device, the latter being dependent for release on the depression of the clutch pedal to the low gear position.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, I claim:

1. In a motor driven vehicle, the combination with the clutch lever and the brake-controlling means; of a safety device including an element constrained to move with the clutch lever to and from set position, and a coacting element constrained to move to set position by a movement of the brake-controlling means in applying the brake and independent of the reverse movement of said brake-controlling means in releasing the brake.

2. In a motor-driven vehicle, the combination with the clutch lever and the brake-controlling means, of a safety device including an element constrained to move to set position by a movement of said clutch lever to the neutral position and constrained to have a reverse movement from the set position by a movement of said clutch lever to the low gear position; together with a coacting element constrained to move to the set position and coact with the first element with a movement of the brake means in applying the brake, said brake means being movable independently of said coacting element for the release of the brake.

3. A safety device for application to automobiles of the type having a speed lever swingable with the controlling shaft, said device including an element having means to mount it in position on the clutch controlling shaft to be moved by the latter to and from locking position, and a coacting element having means to loosely mount it on the brake controlling shaft of the automobile adjacent to the speed lever thereof, said coacting element having a member adapted to be engaged by the speed lever in a movement of the latter in one direction when the brake-controlling shaft is moved to apply the brake, said member being disengageable by the speed lever in the reverse movement of the latter.

4. A safety device for application to automobiles of the type having a speed lever swingable with the controlling shaft, said device including an element having means to mount it in position on the clutch controlling shaft to be moved by the latter to and from locking position, and a coacting element having means to loosely mount it on the brake controlling shaft, of the automobile adjacent to the speed lever thereof, said coacting element having a member adapted to be engaged by the speed lever in a movement of the latter in one direction when the brake-controlling shaft is moved to apply the brake, said member being disengageable by the speed lever in the reverse movement of the latter; together with means to throw said coacting element to the release position when disengaged from the first element and the speed lever.

5. The combination with the clutch shaft of a vehicle and the controller shaft thereof, of an element movable to and from the operative position with the turning of the clutch shaft, and a coacting element movable into a position to be engaged by the first mentioned element with the turning of the controller shaft to the position of applying the brake, said controller shaft being turnable in the reverse direction for releasing the brake independently of said coacting element and without releasing the latter, said coacting element being constrained to move to release position by a movement of the clutch shaft to the low gear position.

6. In a safety device for automobiles of the type embodying one element constrained to move to and from set position with the movements of the clutch lever to and from neutral position, to be engaged by or disengaged from a coacting element; means to coact with said element, said means including an element having means whereby to loosely mount the same on the brake controller shaft of the automobile, and means to cause a movement of said last-mentioned element to set position by a brake-applying movement of the controller shaft, said last-mentioned element being independent of the reverse movement of said last-mentioned means.

7. In a safety device for automobiles of the type embodying one element constrained to move to and from set position with the movements of the clutch lever to and from neutral position, to be engaged by or disengaged from a coacting element; means to coact with said element, said means including an element having means whereby to loosely mount the same on the brake controller shaft of the automobile, and means to cause a movement of said last-mentioned element to set position by a brake-applying movement of the controller shaft, said last-mentioned element being independent of the reverse movement of said last-mentioned means; together with means independently of the last-mentioned means to restore said last-mentioned element.

8. In a safety device for automobiles of the type embodying one element constrained to move to and from set position with the movements of the clutch lever to and from neutral position, to be engaged by or disengaged from a coacting element; means to coact with said element, said means including an element having means whereby to loosely mount the same on the brake controller shaft, and means to cause a movement of said last-mentioned element to set position, said last-mentioned element being independent of the reverse movement of said last-mentioned means.

9. For use with the safety element provided on motor-driven vehicles and movable to and from set position with the movement of the clutch lever from and to low gear position; an element to coact with said first element, and an actuating device for the latter, said coacting element being adapted to be mounted for movement by said actuating device in one direction for carrying it to set position to coact with the first element, and said actuating device being reversibly movable independent of said coacting element; together with means to mount the actuating means to be dependent on the turning movement of the controller of the automobile in the application and release of the brake.

10. An element to coact with the safety element movable to set position on certain types of automobiles with the rocking of the clutch shaft, said first-mentioned element having means to mount the same loosely on the controller shaft of the automobile, and setting means to swing said first element to the set position, said setting means being adapted to be mounted on the controller shaft.

11. A safety element to coact with the safety element of the class described movable on certain types of automobiles with the rocking of the clutch shaft, said first-mentioned element having means to mount the same loosely on the controller shaft of the automobile, and setting means to swing said first element to the set position, said setting means being adapted to be mounted on the controller shaft; together with means to swing said first element from the set position.

JOSEPH CALCATERRA.